Jan. 24, 1928.
L. H. VOSS
1,657,289
INSIDE TIRE BOOT
Filed Feb. 15, 1926
2 Sheets-Sheet 1
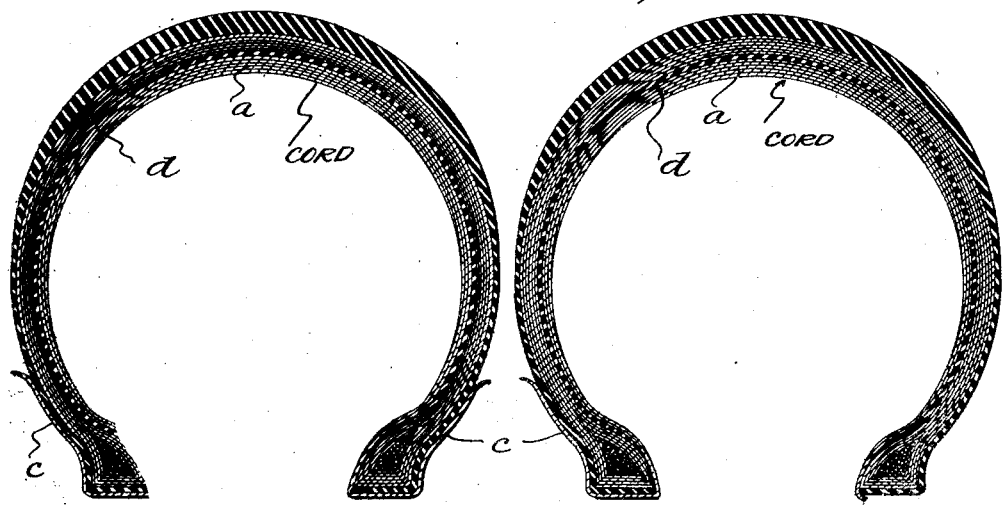
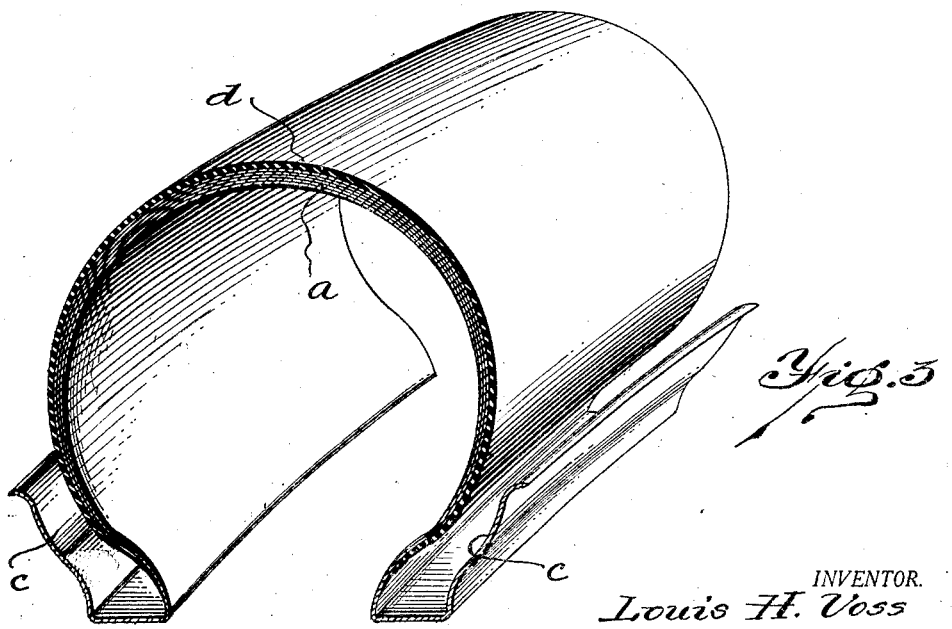
INVENTOR.
Louis H. Voss
BY
Stuart C. Barnes
ATTORNEY.

Jan. 24, 1928.
L. H. VOSS
INSIDE TIRE BOOT
Filed Feb. 15, 1926
1,657,289
2 Sheets-Sheet 2
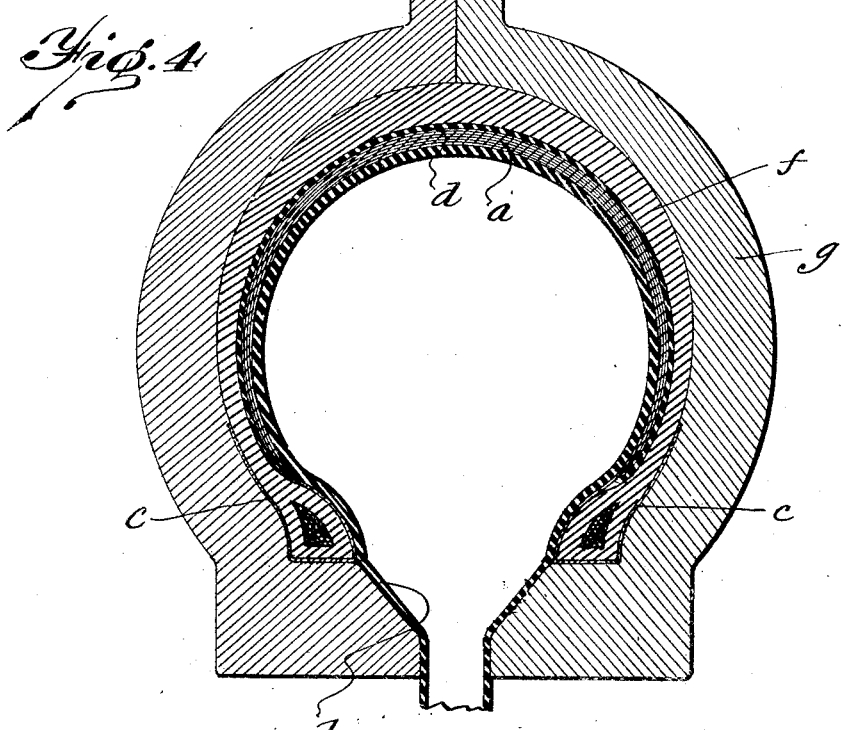
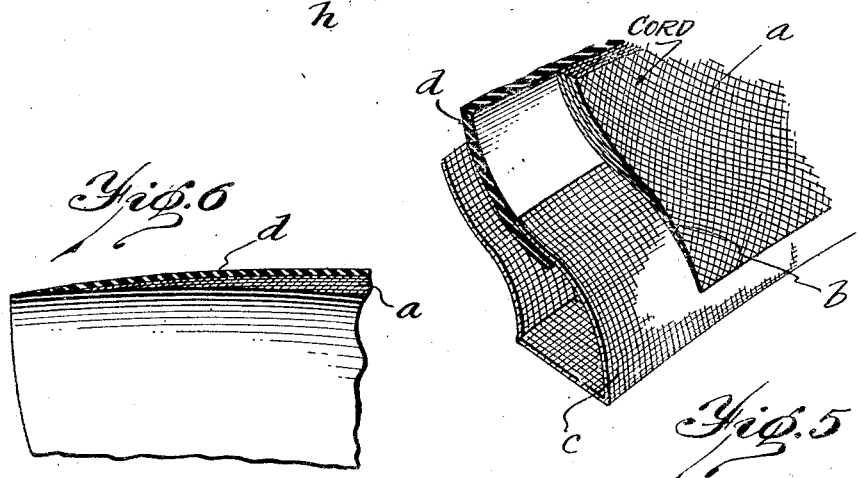
INVENTOR.
Louis H. Voss
BY
Stuart C Barnes
ATTORNEY.

Patented Jan. 24, 1928.

1,657,289

UNITED STATES PATENT OFFICE.

LOUIS H. VOSS, OF DETROIT, MICHIGAN.

INSIDE TIRE BOOT.

Application filed February 15, 1926. Serial No. 88,267.

This invention relates to tire boots, and it is the object of the invention to provide a tire boot of greatly increased durability.

Tires have ordinarily in the past been scrapped when the casing was severely broken, it being found more advantageous to purchase new tires than to repair or patch the old tires.

It has been common practice to use temporary boots on the inside of tires, but these boots are so constructed that they are only temporarily expedient and are not calculated to give greater longevity to the life of the tire than had theretofore been the case. It is the object of the present invention to provide a boot which is so constructed, fitted and designed that it becomes functionally practically a unit part of the tire, and which can be readily removed or replaced. When I speak of its functionally becoming a unit part of the tire, I have reference to the durability, the functioning and results that are fairly comparable to the repair practice in the past, of inserting a complete section in the tire casing. This, however, is a relatively expensive operation, especially when the tire cross section is large, as with the balloon tire, and the section is also large.

I am aware that the art relating to both outside and inside boots is highly developed and that there are numerous patents showing severally most of the features that go to make up my improved boot, but so far as I am aware, I am the first one to so co-ordinate and arrange these features as to make an inside boot of maximum strength, durability, and proof against creeping or dislocation. This will be more fully explained hereinafter.

In the drawings:

Figs. 1 and 2 are views of two forms of my improved boot, shown installed in a tire.

Fig. 3 is a sectional perspective of one form of the boot.

Fig. 4 is a view showing the manner of manufacture.

Fig. 5 is a sectional perspective showing how the layers of fabric and gum are put together.

Fig. 6 is a fragmentary longitudinal section of the boot.

Referring to Figs. 4 and 5, the composition of the boot will be better understood by describing how it is built up. A piece of cord webbing is cut out of preferably an old tire—this is designated $a$. At the sides the webbing is scarfed or thinned down as at $b$ to merge into the wing of the boot. The wing of the boot is designated $c$, and is made of woven gummed fabric. This gummed fabric permits it to be stuck to the scarfed side edge of the web. A sheet of rubber gum, designated $d$, is then laid over the cord web and slightly overlaps the woven gummed fabric. This built-up boot, which is still in its green condition, is laid inside the piece of tire carcass $f$ located in the mould $g$. An air bag $h$ is then set inside of the boot and the carcass and inflated.

The usual vulcanizing now takes place by applying heat. This serves to melt the rubber gum and convert it into properly cured rubber. This gives a comparatively thick coating of rubber over the tread and the sides of the boot. The gummed woven fabric has enough rubber gum in it that it is given a skin coat of rubber and becomes impregnated with the vulcanized rubber. This not only water-proofs the fabric, but has a very useful feature in giving the wings such a mould as is shown in Fig. 3,— that is, the wings are nicely shaped to fit over the bead of the tire. This is very useful feature, for with the wings so shaped the tire boot fits very nicely into the tire so that it is neither torn nor is there any noticeable tendency for the same to creep. The use of the thick rubber coating on the sides and tread of the boot is a marked improvement over most of the temporary boots that are on the market for it successfully resists the abrasion due to the contact of the boot with the rough inside fabric with the tire shoe. This, in the temporary boots, abrades the boot and wears it so that it soon gives way. The use of the cord web nicely synchronizes the action of the boot with the action of the cord tire-for practically all tires are now cord tires. It makes it a boot which is easily extensible and contractable, whereas the common form of boot is made of coarse woven fabric and is practically inextensible and non-elastic.

This tire boot is preferably formed over a section of a carcass of the tire on which it is to be used, or at least over a section of a carcass which closely simulates the tire on which it is to be used. This makes the boot practically a tailor-made job. It is preferable to scarf the ends of the cord web as shown in Fig. 6.

What I claim is:

1. An inside boot, comprising a web, a fabric abutting armor of rubber vulcanized over the web, and separate vulcanized wings of rubber impregnated fabric having a permanent set corresponding substantially to the dimensions and shape of the bead of the tire on which the boot is to be used said wings being vulcanized between the web and the armor.

2. An inside boot, comprising a web of tire cord overlaid with a relatively good coat of fabric-abutting armor of vulcanized rubber, in combination with rubber impregnated and vulcanized wings united thereto between the web and coat of rubber and having a permanent set shape approximating the shape and dimensions of the bead with which the boot is to be used.

In testimony whereof I have affixed my signature.

LOUIS H. VOSS.